(12) United States Patent
Chavez, Jr.

(10) Patent No.: US 6,374,113 B1
(45) Date of Patent: *Apr. 16, 2002

(54) DYNAMIC CALL COVERAGE PATHS BASED ON TERMINAL LOCATION

(75) Inventor: David L. Chavez, Jr., Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/162,497

(22) Filed: Sep. 29, 1998

(51) Int. Cl.⁷ .................................................. H04B 1/38
(52) U.S. Cl. ........................ 455/456; 455/417; 455/519
(58) Field of Search ................................. 455/414, 417, 455/445, 422, 435, 457, 458, 459, 461, 517, 456, 518, 519; 379/211, 214, 210, 230

(56) References Cited

U.S. PATENT DOCUMENTS

| | | | | |
|---|---|---|---|---|
| 4,436,962 A | * | 3/1984 | Davis et al. ................ | 379/211 |
| 5,416,834 A | * | 5/1995 | Bales et al. ................ | 379/211 |
| 5,761,620 A | * | 6/1998 | Furuya et al. .............. | 455/445 |
| 5,946,611 A | * | 8/1999 | Dennison et al. ........... | 455/445 |
| 5,978,673 A | * | 11/1999 | Alperovich et al. ......... | 455/417 |
| 6,101,396 A | * | 8/2000 | Chavez, Jr. ................. | 455/556 |
| 6,192,234 B1 | * | 2/2001 | Chavez, Jr. ................. | 455/445 |
| 6,240,069 B1 | * | 5/2001 | Alperovich et al. ......... | 455/445 |

* cited by examiner

*Primary Examiner*—Nay Maung
*Assistant Examiner*—Quochien B. Vuong
(74) *Attorney, Agent, or Firm*—John C. Moran

(57) ABSTRACT

A wireless terminal is dynamically placed into a call coverage group based on the location of the wireless terminal. Similarly, a wireless terminal is dynamically removed from a call coverage group on the basis of the location of the wireless terminal. In addition, within a call coverage group, the position of a wireless terminal that is in communication with an auxiliary desktop unit is determined by a preassigned position within the call coverage group of the auxiliary desktop unit. The wireless terminal in communication with the auxiliary desktop unit is always assigned this preassigned location in the call coverage group. Other call coverage groups that are based on geographical location and where the wireless terminal is not communication with an auxiliary desktop unit have wireless terminals assigned into the call coverage path group based on a predefined algorithm.

13 Claims, 11 Drawing Sheets

TABLE 1

| WIRELESS TERMINAL | FIXED OR AUX UNIT | CALL COVERAGE GROUP NUMBER | CALL COVERAGE TYPE |
|---|---|---|---|
| 101 | 102 | 1 | P |
| 203 | | | |
| 204 | 215 | 1 | L |
| 205 | 215 | 1 | L |
| 206 | 215 | 1 | P |
| 207 | 216 | 1 | P |
| 208 | 216 | 1 | P |
| 209 | 216 | 1 | P |

*FIG. 10*

TABLE 2

| LOCATION CALL COVERAGE GROUP | COVERED TELEPHONE NUMBER | WIRELESS TERMINALS | | | | |
|---|---|---|---|---|---|---|
| 1 | 8213 | 204 | 205 | 206 | | |
| | | | | | | |
| | | | | | | |
| | | | | | | |

*FIG. 11*

TABLE 3

| CALL COVERAGE GROUP | COVERED # | COVERING WIRELESS TERMINALS | | | | | |
|---|---|---|---|---|---|---|---|
| | | AUX UNIT | WT | AUX UNIT | WT | AUX UNIT | WT |
| 1 | 203 | 102 | 101 | | 207 | | 208 |
| | | | | | | | |
| | | | | | | | |
| | | | | | | | |

*FIG. 12*

| TABLE 1 | | | |
|---|---|---|---|
| WIRELESS TERMINAL | FIXED OR AUX UNIT | CALL COVERAGE GROUP NUMBER | CALL COVERAGE TYPE |
| 101 | 215 | 1 | L |
| 203 | | | |
| 204 | 215 | 1 | L |
| 205 | 215 | 1 | L |
| 206 | 215 | 1 | P |
| 207 | 216 | 1 | P |
| 208 | 216 | 1 | P |
| 209 | 216 | 1 | P |

*FIG. 13*

| TABLE 2 | | | | | | |
|---|---|---|---|---|---|---|
| LOCATION CALL COVERAGE GROUP | COVERED TELEPHONE NUMBER | WIRELESS TERMINALS | | | | |
| 1 | 8213 | 204 | 205 | 101 | | |
| | | | | | | |
| | | | | | | |
| | | | | | | |

*FIG. 14*

| TABLE 3 | | | | | | | |
|---|---|---|---|---|---|---|---|
| CALL COVERAGE GROUP | COVERED # | COVERING WIRELESS TERMINALS | | | | | |
| | | AUX UNIT | WT | AUX UNIT | WT | AUX UNIT | WT |
| 1 | 203 | 102 | 206 | | 207 | | 208 |
| | | | | | | | |
| | | | | | | | |
| | | | | | | | |

*FIG. 15*

DYNAMIC CALL COVERAGE PATHS BASED ON TERMINAL LOCATION

TECHNICAL FIELD

This invention relates to wireless telecommunication terminals, and, in particular, to the provision of call coverage paths.

BACKGROUND OF THE INVENTION

In prior art business telecommunications switching systems, call coverage groups are well known. A call coverage group allows a list of telephones to be stored within the switching system to handle calls for a telephone of a principal. When the switching system receives a call for the principal's telephone and the principal's telephone does not answer, the switching system attempts to connect the calling party with the first telephone in the call coverage telephone group. If the first telephone is unavailable, then the second telephone in the call coverage group is selected. In the prior art, the call coverage groups are administered manually.

The prior art call coverage groups have functioned well with wired telephone sets and wireless telephones where the wireless telephone was a second telephone set for a user. In addition, prior art call coverage groups and their administration have functioned well for the traditional business environments where an employee is assigned a desk or a specific location and performs their principal work function at that telephone or location. For example, the traditional environment is for a principal to have a telephone and for the first telephone in the call coverage path of the principal's telephone to be the principal's secretary. The traditional environment is slowly changing. In the emerging business environment, individuals do not have a wired telephone but rather they have a wireless telephone which they carry with them at all times and which is their only telephone set. In addition, employees during the course of a day perform many functions at different locations. For example, a principal's secretary may vary with the time of day.

SUMMARY OF THE INVENTION

The foregoing problems are solved, and a technical advance is achieved by an apparatus and method in which a wireless terminal is dynamically placed into a call coverage group based on the location of the wireless terminal. Similarly, a wireless terminal is dynamically removed from a call coverage group on the basis of the location of the wireless terminal. In addition, within a call coverage group, the position of a wireless terminal that is in communication with an auxiliary desktop unit is determined by a preassigned position within the call coverage group of the auxiliary desktop unit. The wireless terminal in communication with the auxiliary desktop unit is always assigned this preassigned location in the call coverage group. Advantageously, other call coverage groups that are based on geographical location and where the wireless terminal is not communication with an auxiliary desktop unit have wireless terminals assigned into the call coverage path group based on a predefined algorithm.

Other and further aspects of the present invention will become apparent during the course of the following description and by reference to the accompanying drawing.

BRIEF DESCRIPTION OF THE DRAWINGS

FIGS. 10–15 illustrate tables used by a wireless switching system.

DETAILED DESCRIPTION

Figure 1:
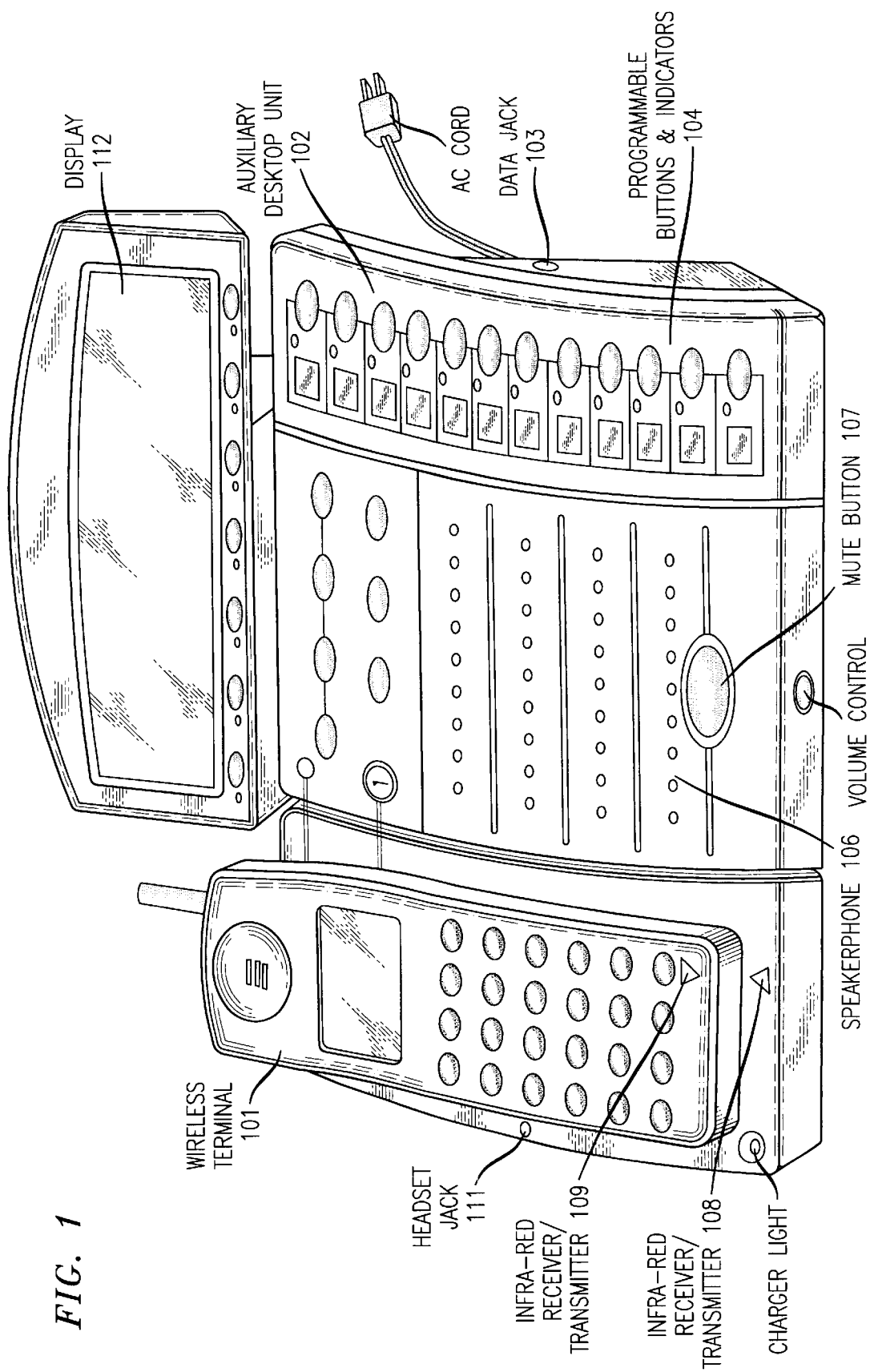
FIG. 1 illustrates a conceptual view of a wireless terminal inserted into an auxiliary desktop unit for use with the invention.

FIG. 1 illustrates wireless terminal 101 inserted into auxiliary desktop unit 102. All voice, data, and control information communicated between wireless terminal 101 and auxiliary desktop unit 102 is communicated by wireless terminal 101 to a wireless telecommunication switching system not illustrated in FIG. 1. Data and control information is communicated between wireless terminal 101 and auxiliary desktop unit 102 by infra-red receiver/transmitter 109 in wireless terminal 101 and infra-red receiver/transmitter 108 in auxiliary desktop unit 102. Auxiliary desktop unit 102 provides standard programmable buttons and indicators 104 that are programmable to provide different telephone features and speed dialing. The functions performed between wireless terminal 101 with auxiliary desktop unit 102 can also be performed by wireless terminal 204–209.

Figure 2:
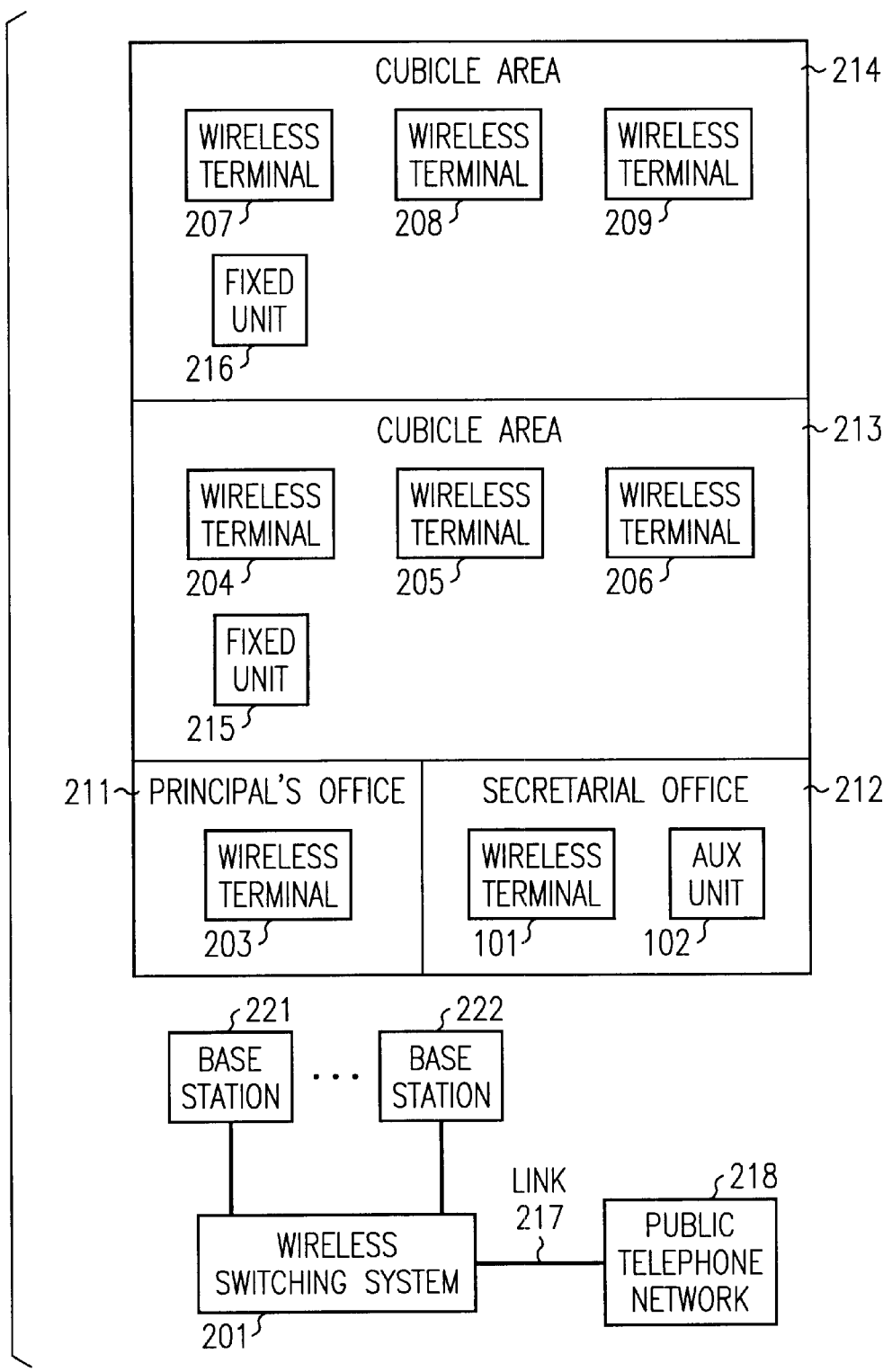
FIG. 2 illustrates, in block diagram form, a system in accordance with the invention.

The manner in which wireless terminal 101 and auxiliary desktop unit 102 are utilized in the present invention is illustrated in FIG. 2. FIG. 2 illustrates an office environment comprising cubicle areas 213 and 214, principal's office 211 and secretarial office 212. Telephone service for the office environment illustrated in FIG. 2 is provided by wireless terminals 203–209, wireless terminal 101, base stations 221–222 and wireless switching system 201. Wireless terminal 203 is provided for the principal. The call coverage path group for wireless terminal 203 is as follows, the wireless terminal associated with auxiliary unit 102 and wireless terminal 207, wireless terminal 208, and wireless terminal 209. As presently shown in FIG. 2, wireless terminal 101 is in communication with auxiliary unit 102, wireless switching system 201 places wireless terminal 101 as the first wireless terminal that calls to which for wireless terminal 203 will be directed. However, if wireless terminal 101 leaves a secretarial office 212 and enters cubicle area 213, wireless switching system 201 removes wireless terminal 101 from the call coverage group for wireless terminal 203. Similarly, if wireless terminal 206 enters secretarial office 212 and establishes communication with auxiliary unit 102, then, wireless terminal 206 is placed into the call coverage group for wireless terminal 203 as the first wireless terminal in that call coverage group.

Wireless switching system 201 is informed of which wireless terminal is in communication with auxiliary unit 102 in the following manner. Auxiliary unit 102 is periodically transmitting its identification code via the infrared medium. When wireless terminal 101 enters secretarial office 212, it receives the infrared transmission and establishes a data call to wireless switching system 201. Wireless terminal 101 then transmits a message defining that the wireless terminal is in communication with auxiliary unit 102 to wireless switching system 201. Similarly, when wireless terminal 101 left secretarial office 212, wireless terminal 101 detected the loss of the infrared link and transmitted a message to wireless switching system 201 that the wireless terminal was no longer in communication with auxiliary unit 102. In the previous example, when wireless terminal 101 entered cubicle area 213, wireless terminal 101 received an infrared transmission from fixed unit 215. Wireless terminal 101 transmitted the identification of fixed unit 215 to wireless switching system 201 via the wireless data link.

Alternatively, one skilled in the art could readily envision that the auxiliary unit 102, fixed unit 215 and fixed unit 216 could be connected to wireless switching system 201 via either wired or wireless connections. Further, the wireless terminals would transmit the identification of the wireless terminal to the fixed unit via an infrared medium or another medium. The fixed units and auxiliary unit 102 would then transmit the identifications of the wireless terminals to wireless switching system 201. In addition, global positioning satellite (GPS) devices or base stations could be used to determine a position of a wireless terminal.

Wireless switching system 201 provides another type of call coverage group in accordance with the invention. The wireless terminals in cubicle area 213 form an area call coverage group. This call coverage group is maintained as a sequential list. When a new wireless terminal enters cubicle area 213, wireless switching system 201 detects this via the wireless terminal reporting the identification of fixed unit 215. Wireless switching system 201 adds the new terminal at the end of the call coverage group. In the present example, when wireless terminal 101 entered cubicle area 213 it was placed at the end of the area call coverage group. If wireless terminal 205, which is part of the area call coverage group for cubicle area 213, leaves cubicle area 213, then, wireless terminal 205 is completely removed from the area call coverage group. There remains no reference to wireless terminal 205 in the area call coverage group for cubicle area 213.

Figure 3:
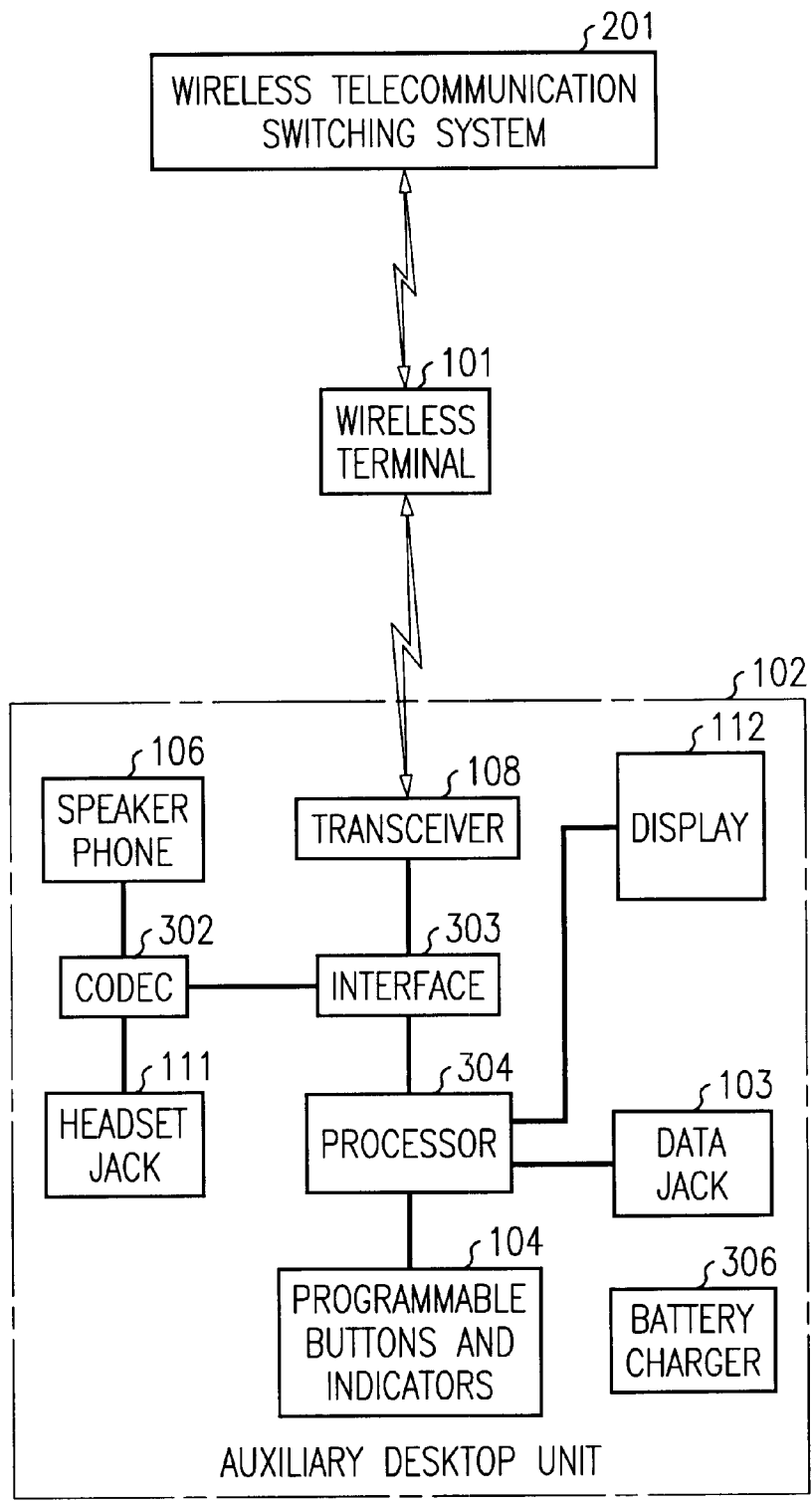
FIG. 3 illustrates, in block diagram form, the interconnection of the wireless terminal to a wireless telecommunication switching system and also to an auxiliary desktop unit.

FIG. 3 illustrates a block diagram illustrating the interconnection between wireless telecommunication switching system 201, wireless terminal 101, and auxiliary desktop unit 102. Auxiliary desktop unit 102 is shown in greater detail in FIG. 3. Wireless terminal 101 is shown in greater detail in FIG. 4. Wireless terminal 101 performs all the call control and high level processing of messages from wireless telecommunication switching system 201. Communication of information between wireless terminal 101 and auxiliary desktop unit 102 is via infra-red transceivers 108 and 109. One skilled in the art could readily envision other types of wireless links. Wireless terminal 101 maintains a control channel, a voice channel, and a data channel with auxiliary desktop unit 102 via the infra-red link. The protocol used on the infra-red link can be any number of well known protocols. Within auxiliary desktop unit 102, interface 303 disassembles and assembles information being communicated on the infra-red link set up between transceivers 108 and 109. The voice information is routed to or from voice code 302 for use either by speakerphone 106 or a headset plugged into headset jack 111. Data information is routed to or from a data device connected on data jack 103. When the infra-red link is first established, processor 304 transmits the identification code for auxiliary desktop unit 102 to wireless terminal 101 which transmits the identification code to wireless switching system 201. Control information is communicated by interface 303 with processor 304. The control information is utilized by processor 304 to control the operations of display 112 and the indicators on subunit 104. Actuation of a programmable button causes processor 304 to transmit control information via interface 303, transceiver 108, and transceiver 109, to wireless terminal 101. Wireless terminal 101 is responsive to this control information to form a high level PHS wireless message that specifies which programmable button has been actuated. Similarly, wireless telecommunication switching system 201 transmits control information to wireless terminal 101 specifying which indicator on auxiliary desktop unit 102 is to be turned on via a high level PHS wireless message. Wireless terminal 101 decodes the PHS wireless message from wireless telecommunication switching system 201 and sends a message via the control channel of the infra-red link to processor 304 specifying that the indicator is to be lit. Wireless telecommunication switching system 201 processes the control information from auxiliary desktop unit 102 to provide features and other telephony operations using techniques well understood by those skilled in the art.

Figure 4:
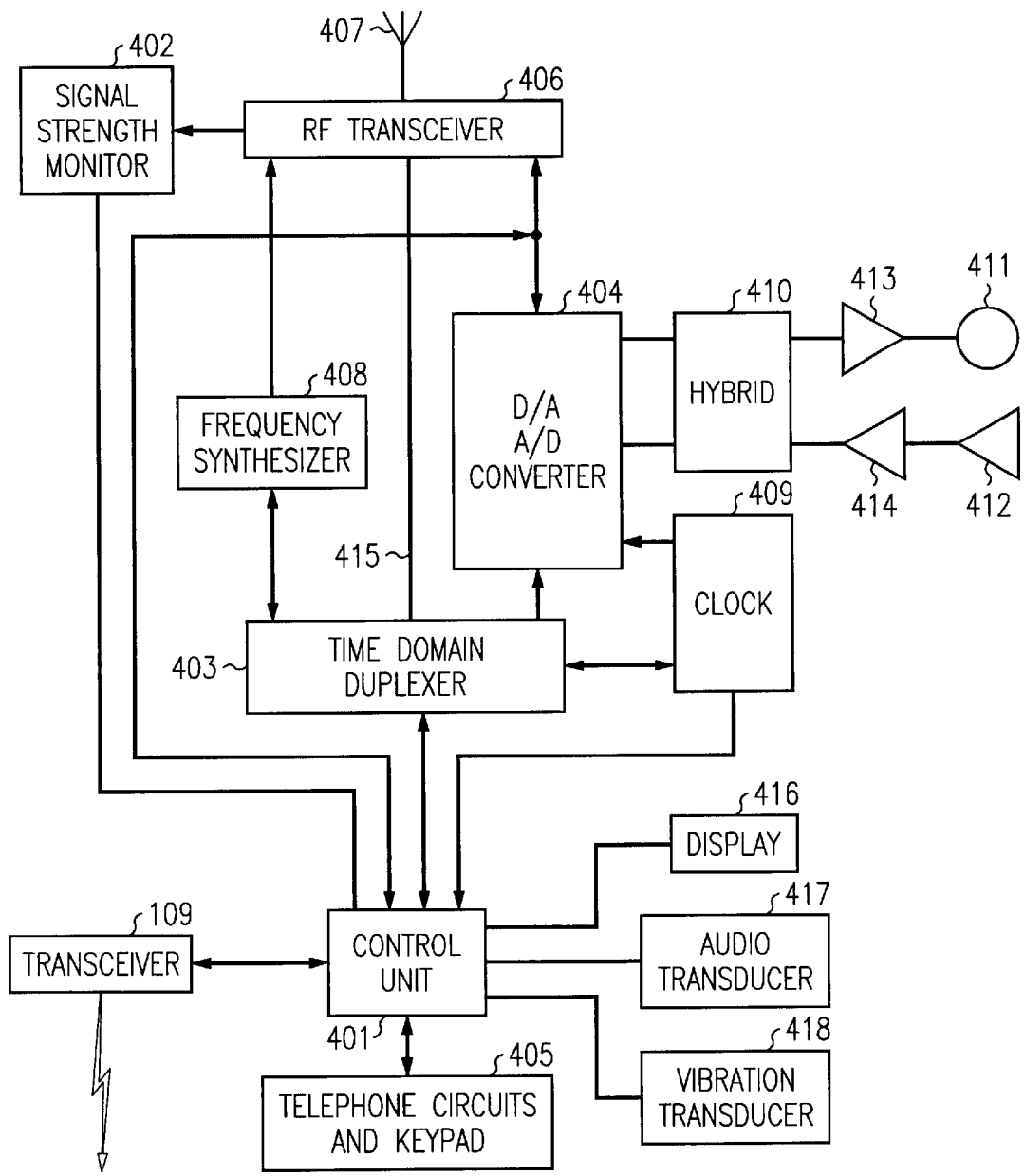
FIG. 4 illustrates, in block diagram form, a wireless terminal.

Wireless handset 101 is illustrated in greater detail in FIG. 4. Wireless handset 101 implements a wireless protocol that allows wireless handset 101 to maintain a wireless signal link with wireless telecommunication switching system 201 via base stations included in wireless telecommunication switching system 201. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless handset is provided by control unit 401. Units 402, 403, 406, 407, 408, and 409 provide the RF communication capabilities for the wireless handset. Elements 404, 410, and 411–414 provide the audio information received and transmitted to the user; whereas, elements 416–418 and 405 provide the basic user interface.

The data and voice information is transmitted or received directly from RF transceiver 406 by control unit 401 and is communicated with auxiliary desktop unit 102 via transceiver 109. One skilled in the art could readily see that this information could be directly received by transceiver 109 from RF transceiver 406. Transceiver 109 would then form this information into the two data channels assigned to communication of voice and data information on the infra-red link. Note, that in the PHS protocol, control unit 401 would have to request one or more bearer channels to provide a channel for the data information that was being communicated with wireless telecommunication switching system 201. It is well known by one skilled in the art how these additional bearer channels are obtained in the PHS protocol.

Figure 5:
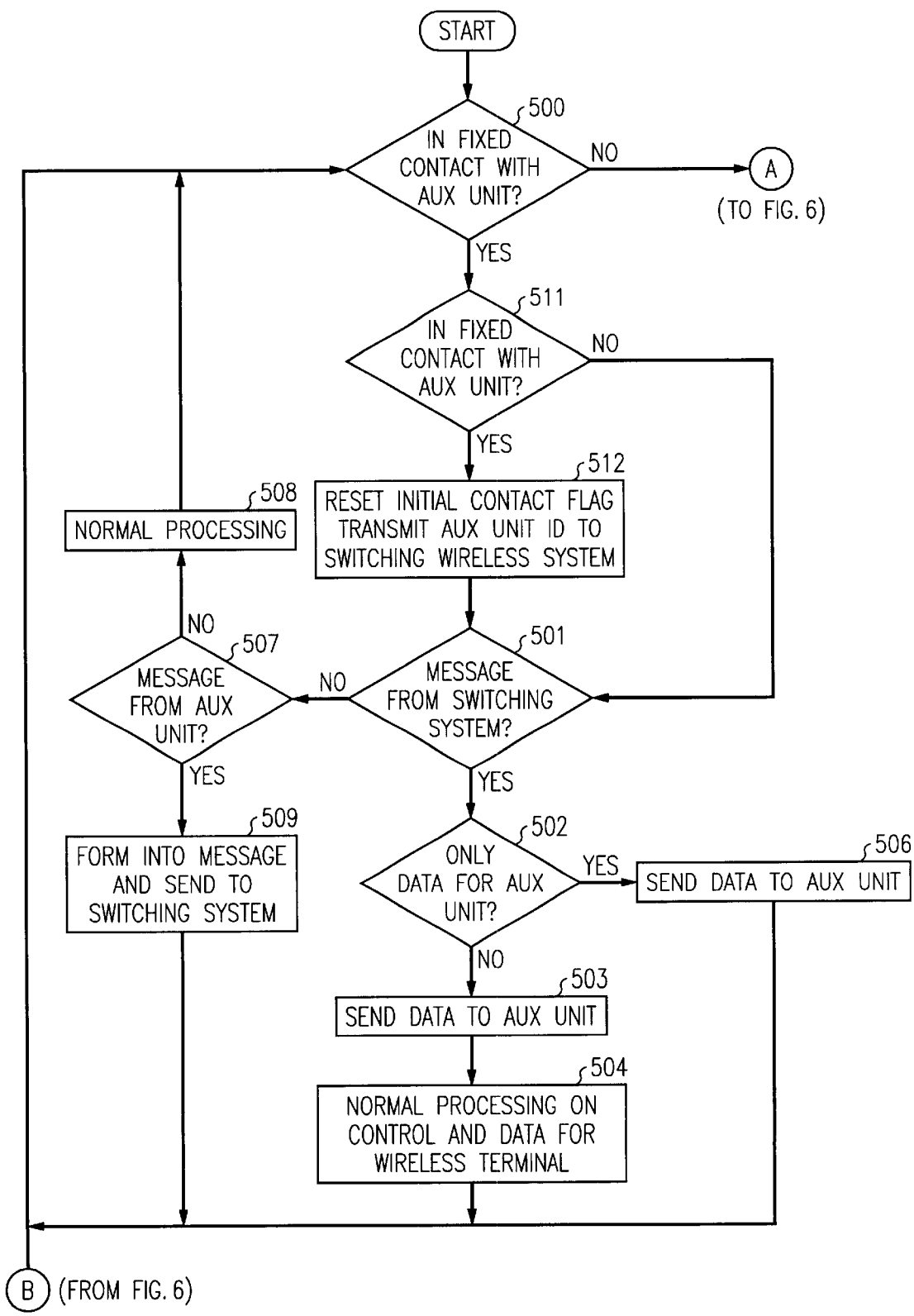
FIGS. 5 and 6 illustrate, in flow chart form, steps performed by a wireless terminal.
Figure 6:
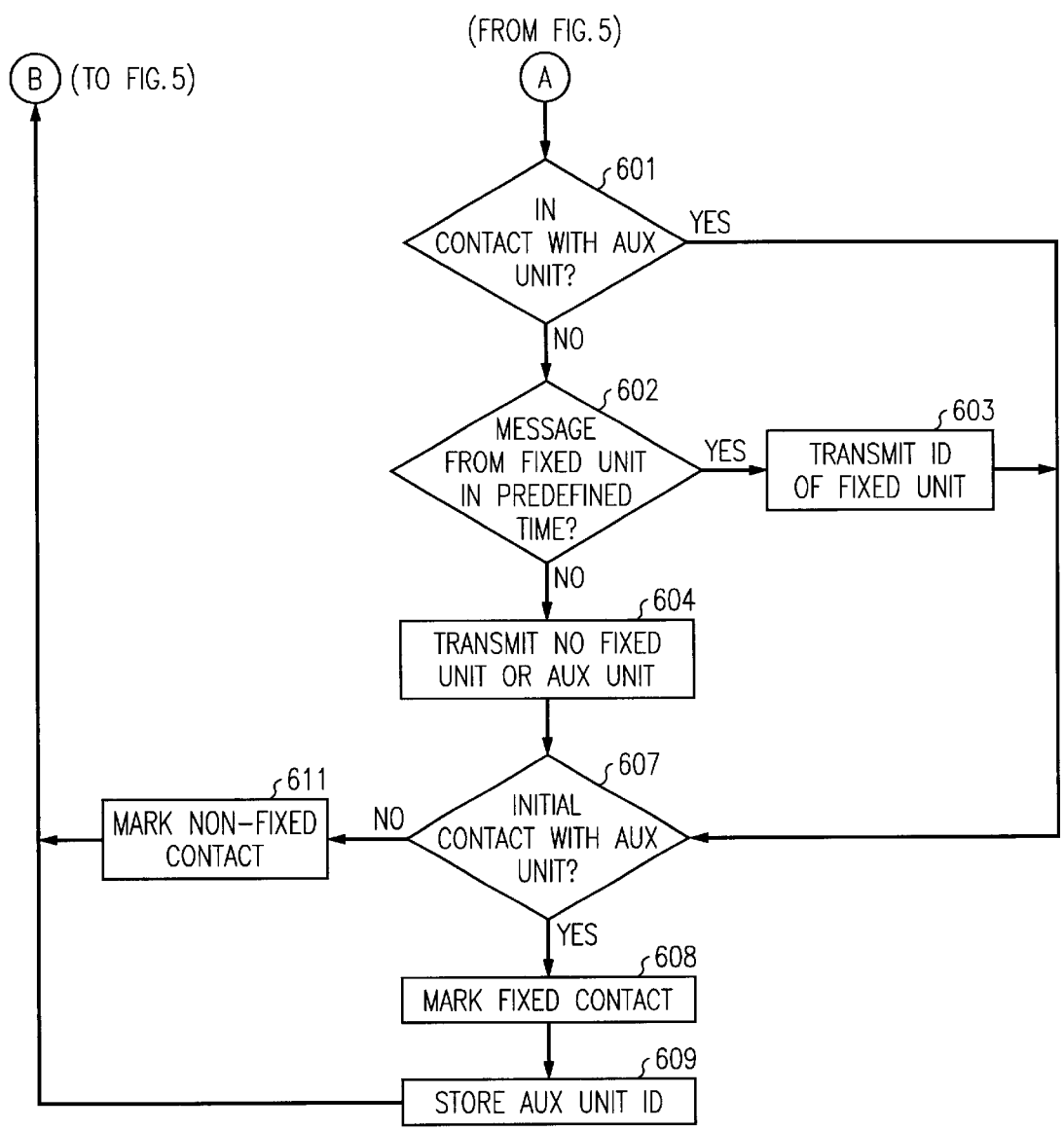

Control unit 401 is responsive to control messages received from wireless telecommunication switching system 201 to extract the INFO elements that define what indicators are to be controlled and the information to be displayed on display 112. Control unit 401 then communicates this information to processor 304 via the infra-red link. Similarly, control unit 401 is responsive to messages from processor 304 defining button actuations on auxiliary desktop unit 102 to encode this information into INFO elements of PHS messages and to transmit those messages to wireless telecommunication switching system 201. In addition, control unit 401 continuously monitors whether or not it is in communication with processor 304. If control unit 401 is in communication with processor 304, it sends control information for the indicators and display received from wireless telecommunication switching system 201 to processor 304. In addition, control unit 401 continuously stores the status of the display and indicators of auxiliary desktop unit 102. If control unit 401 is not in communication with processor 304, it transmits this fact to wireless switching system 201. FIGS. 5 and 6 illustrate the steps performed by a wireless terminal. Decision block 500 determines if the wireless terminal is in fixed contact with the auxiliary desktop unit. Fixed contact means that contact via the infra-red link had been established as detected by decision block 607 of FIG. 6, and the link is still active. If the answer in decision block 500 is yes, control is transferred to decision block 511 which determines if the initial contact flag was set in block 608 of FIG. 6. If the answer is no, control is transferred to decision block 501. If the answer is yes, the initial contact flag is reset, and the identification code of the auxiliary desktop unit is transmitted to the wireless switching system in block 512. After execution of block 512, control is transferred to decision block 501 which determines if there is a message from the wireless telecommunication switching system. If the answer is yes, decision block 502 determines whether this message contains data that is only intended to control some function on the auxiliary desktop unit. Such data would be contained within a INFO element. If the answer in decision block 502 is yes, the data contained in the INFO element is transmitted to the auxiliary desktop unit by block 506 before returning control to decision block 500. If the answer in decision block 502 is no, any data destined for the auxiliary desktop unit is transmitted to the auxiliary desktop unit by block 503. Block 504 then performs normal processing of control and data intended for utilization by the wireless terminal before returning control to decision block 500.

Returning to decision block 501, if the answer is no, decision block 507 determines if there is a message from the auxiliary desktop unit. If the answer is no, block 508 performs normal processing before returning control to decision block 500. If the answer in decision block 507 is yes, the information in the message from auxiliary desktop unit 509 is formed into INFO elements of a message which is sent to the wireless telecommunication switching system before returning control to decision block 500.

Returning to decision block 500, if the wireless terminal is not in fixed contact with the auxiliary desktop unit, control is transferred to decision block 601 of FIG. 6. Decision block 601 determines if there is a message from the wireless telecommunication switching system indicating initial contact with an auxiliary unit. If the answer is no, decision block 602 determines if a message from a fixed unit has been received. A message from the fixed unit would include the identification code of the fixed unit. If the answer is yes in decision block 602, block 603 transmits the identification code of the fixed unit to the wireless switching system before transferring control to block 607. If the answer in decision block 602 is no, control is transferred to block 604. Block 604 transmits a message to the wireless switching system stating that there is no contact with either a fixed unit or an auxiliary unit before transferring control to decision block 607.

After execution of block 604, control is transferred to decision block 607 which determines if initial contact has been established with the auxiliary desktop unit. If the answer is yes, block 608 marks the fact that fixed contact has now been established with the auxiliary desktop unit and sets the initial contact flag. Block 609 stores the identification code of the auxiliary desktop unit for later transmission to the wireless switching system by 512 of FIG. 5. After execution of block 609, control is transferred to decision block 500 of FIG. 5. If the answer in decision block 607 is no, block 611 marks that non-fixed contact is present with respect to the auxiliary desktop unit before transferring control to decision block 500 of FIG. 5. Returning to decision block 601, if the answer in decision block 601 is yes, control is transferred to decision block 607.

Decision block 607 determines if contact with an auxiliary unit had been detected by decision block 601. If the answer is no, block 611 marks non-fixed contact before returning control back to decision block 500 of FIG. 5. If the answer is yes in decision block 607, block 608 marks fixed contact. Then, block 609 stores the auxiliary unit identification information before transferring control back to decision block 500 of FIG. 5.

Figure 7:
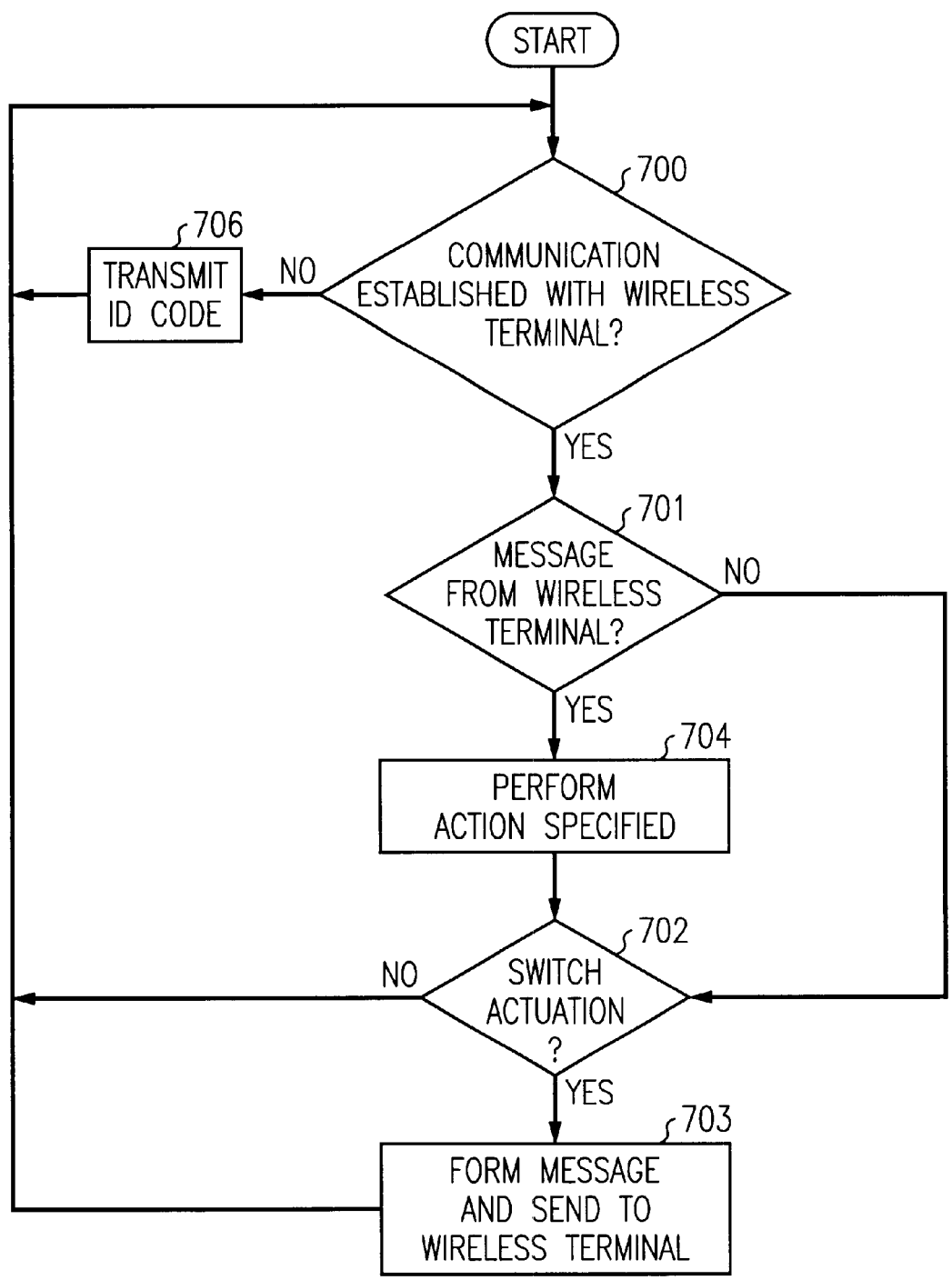
FIG. 7 illustrates, in flow chart form, steps performed by an auxiliary desktop unit.

FIG. 7 illustrates the steps performed by processor 304 of auxiliary desktop unit 102. Decision block 700 determines if communication is established with a wireless terminal. If the answer is no, block 706 transmits the identification code on the infrared link before returning control to decision block 700. If the answer in decision block 700 is yes, control is transferred to decision block 701.

Decision block 701 determines if a message has been received from the wireless terminal. If the answer is no, control is transferred to decision block 702. If the answer is yes in decision block 701, control is transferred to block 704 which performs the action specified in the message before transferring control to decision block 702. Decision block 702 determines if there has been any type of switch actuation on the auxiliary desktop unit. If the answer is no, control is transferred back to decision block 700. If the answer is yes in decision block 702, block 703 forms a message specifying the switch actuation and sends this message to the wireless terminal before transferring control back to decision block 700.

Figure 8:
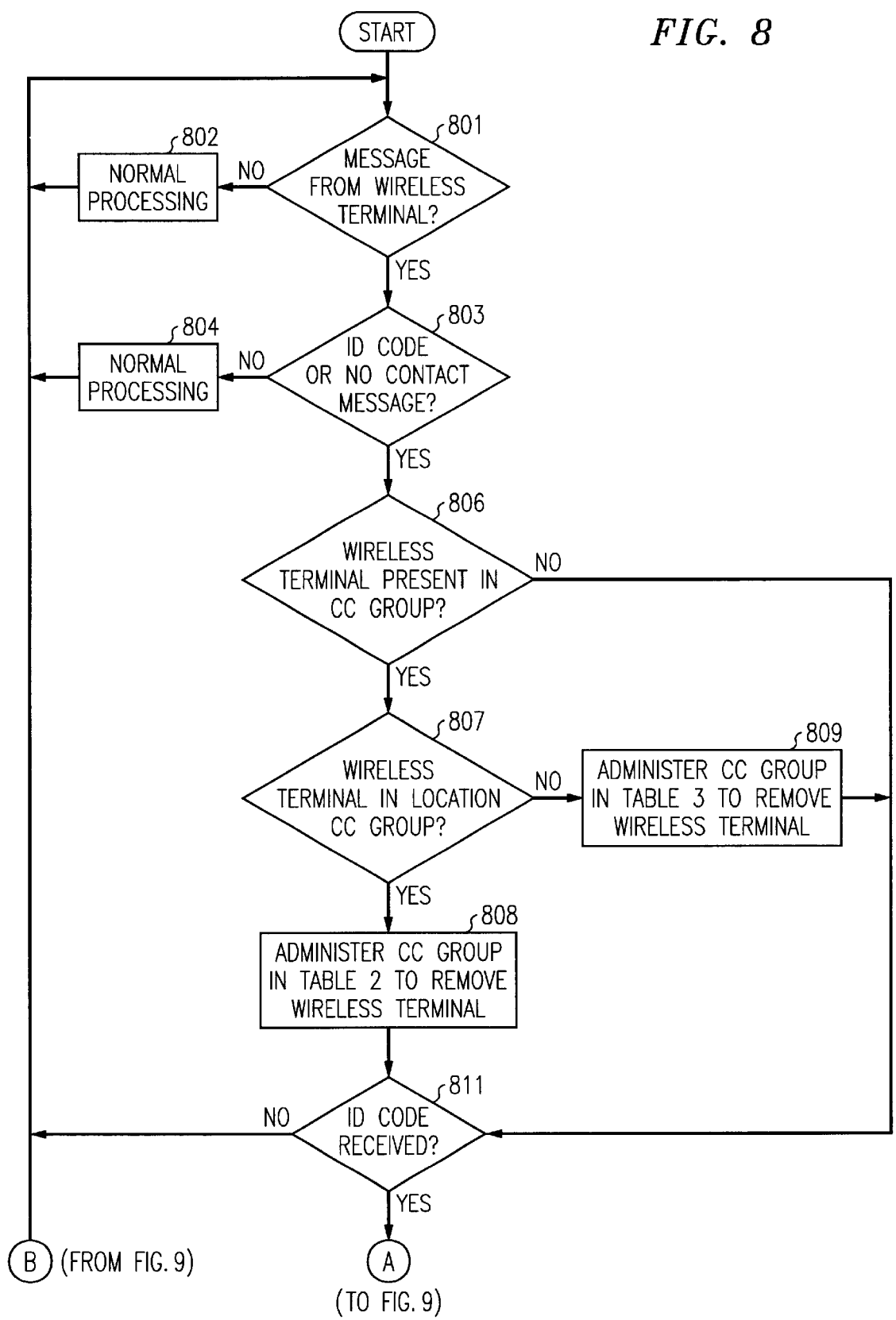
FIGS. 8 and 9 illustrate, in flow chart form, steps performed by a wireless switching system.
Figure 9:
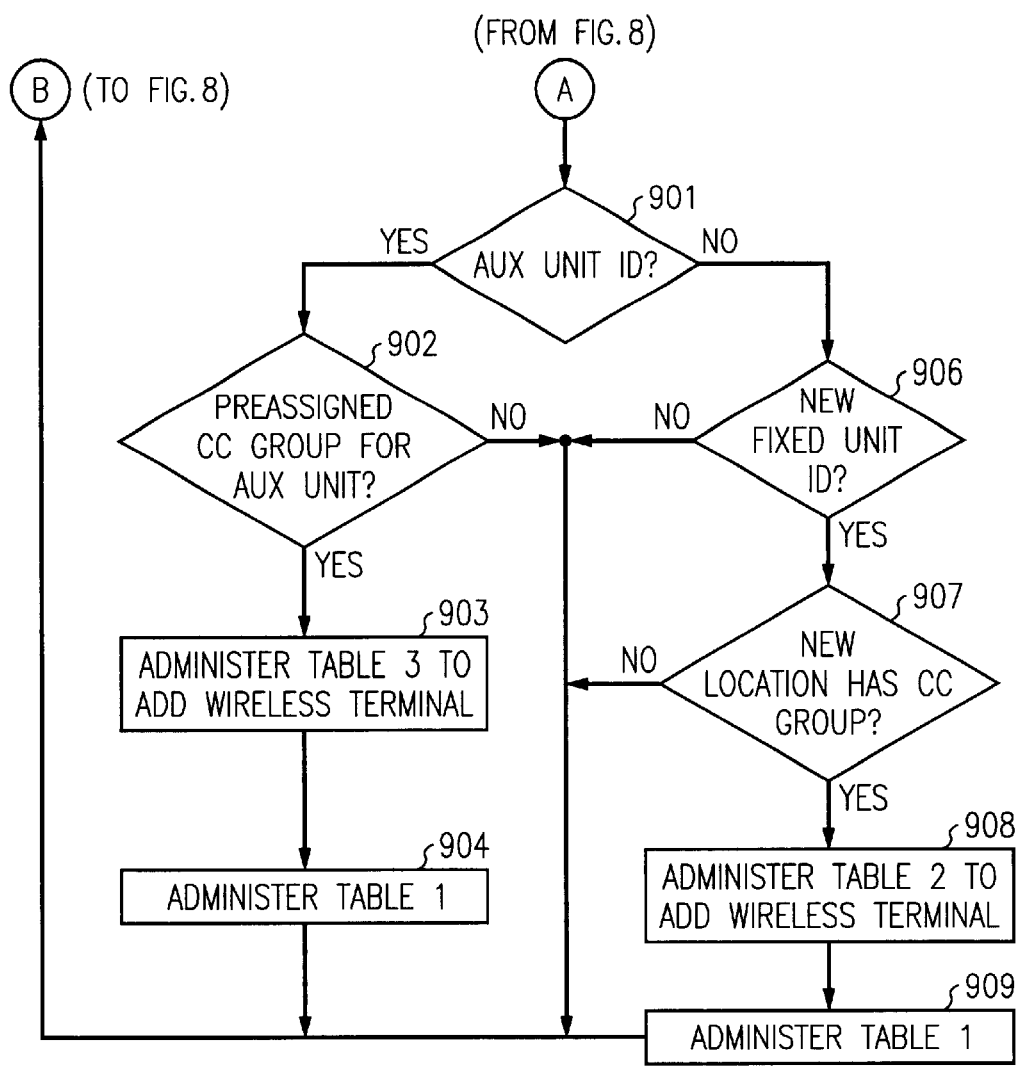

FIGS. 8 and 9 illustrate, in flowchart form, the operations performed by wireless switching system 201 in implementing the invention. Wireless switching system 201 stores internally Tables 1, 2, and 3 of FIGS. 10–15. FIGS. 10–12 illustrate the initial state of the previous example. Table 1 of FIGS. 10 and 13 define for each wireless terminal the fixed unit or auxiliary unit with which the wireless terminal is in contact. Table 1 also defines if the wireless terminal is part of a call coverage group, the number of that group, and its type. The call coverage groups are set forth in Tables 2 and 3. Table 2 of FIGS. 11 and 14 define the location call coverage groups. The covered telephone number for a location coverage group is the number assigned to that location. For example, location call coverage group 1 provides coverage for the number assigned to cubicle area 213 which is 8213. Table 3 of FIGS. 12 and 15 defines the preassigned call coverage. groups. If an auxiliary unit is part of the preassigned call coverage group then its position remains constant within that call coverage group regardless of the wireless terminal that is in communication with the auxiliary unit. This is illustrated in Table 3 of FIGS. 12 and 15 for auxiliary unit 102. Initially in the previously example, wireless terminal 101 was in contact with auxiliary unit 102 and was part of call coverage group number 1 for call coverage type P as illustrated in Table 1. Table 3 of FIG. 12 illustrates that wireless terminal 101 is the first terminal in call coverage group 1 for the covered telephone number 203. Wireless terminals 207 and 208 complete the call coverage group illustrated in Table 3. Table 1 of FIG. 10 shows that wireless terminals 207 and 208 were in contact with fixed unit 216 but assigned to the call coverage group 1 of Table 3. Table 1 of FIG. 10 illustrates that wireless terminals 204–206 were initially part of a location coverage group for area 213. Table 2 also illustrates this fact.

When wireless terminal 101 moves from communication with auxiliary unit 102 to location 213 and communication with fixed unit 215, Table 1 is updated as illustrated in FIG. 13. Wireless terminal 101 is shown as communicating with fixed unit 215 and being part of call coverage group number 1 as illustrated in Table 2 of FIG. 14. When wireless terminal 101 shifted to location 213, wireless terminal 206 entered secretarial office 212 and commenced communication with auxiliary unit 102. Wireless terminal 206 then becomes part of call coverage group 1 of preassigned coverage groups as illustrated in Table 3 of FIG. 15. Note, that wireless terminal 206 is the first wireless terminal in the call coverage path for wireless telephone 203 of Table 3 as illustrated in FIG. 15. Tables 1 and 2 were also updated in FIGS. 13 and 14, respectively, to reflect the movement of wireless terminal 206.

Turning now to the operations performed by wireless switching system 201 as illustrated in FIGS. 8 and 9, decision block 801 determines if a message has been received from a wireless terminal. If the answer is no, normal processing is performed by block 802 before returning control to decision block 801. This normal processing includes transmitting messages to the wireless terminals and performing other standard call processing operations. If the answer in decision block 801 is yes, decision block 803 determines if an identification code or a no contact message has been received from a wireless terminal. A no contact message is transmitted by a wireless terminal when the wireless terminal is not in communication with a fixed unit or an auxiliary unit. If the answer in decision block 803 is no, then the message received from the wireless terminal is processed in a normal manner by block 804 before returning control to decision block 801.

If the decision in decision block 803 is yes, decision block 806 determines if the wireless terminal is presently in a call coverage group. This determination is made by examining Table 1 of FIG. 10 or 13. If the answer is no in decision block 806, control is transferred to decision block 811. Assuming that the answer is yes in decision block 806, decision block 807 examines Table 1 to determine in which call coverage group the wireless terminal is present. If the wireless terminal is in a location call coverage group, control is transferred to block 808 which performs the necessary administration operations on Table 2 to remove the wireless terminal from the location call coverage group. In the previous example, where wireless terminal 206 left cubicle area 213, Table 2 was updated to reflect that wireless terminal 206 was no longer part of location call coverage group 1 as illustrated in FIG. 14. After execution of block 808, control is transferred to decision block 81 1.

Returning to decision block 807, if the answer is that the wireless terminal is not part of a location call coverage group, then the wireless terminal is part of a preassigned call coverage group, and block 809 performs the necessary administrative functions on Table 3 to remove the wireless terminal from Table 3. When wireless terminal 101 left secretarial office 212, reference to wireless terminal 101 was removed from Table 3 as illustrated in FIG. 15. After execution of block 809 or block 808, control is transferred to decision block 811. Decision block 811 now determines from the message received from the wireless terminal if there is an identification code for either a fixed unit or an auxiliary unit present in the message. If the answer is no, then control is transferred back to decision block 801. If the answer is yes, in decision block 811, control is transferred to decision block 901 of FIG. 9.

Decision block 901 determines if the identification code in the message from the wireless terminal is the identification code of an auxiliary unit. If the answer is yes, decision block 902 determines if the auxiliary unit is part of a preassigned call coverage group by examining Table 3. In the case of auxiliary unit 102, the answer would be yes. If the answer is no in decision block 902, control is transferred back to decision block 801 of FIG. 8. If the answer is yes in decision block 902, block 903 administers Table 3 to add the wireless terminal into the proper call coverage group and position within that group as defined by the auxiliary unit positioned within the call coverage group. Block 904 then administers Table 1 to reflect the call coverage group of which the wireless terminal is part before transferring control back to decision block 801 of FIG. 8.

Returning to decision block 901, if the identification information is not an auxiliary unit, then the identification unit must be that for a fixed unit, and control is transferred to decision block 906. The latter decision block examines Table 1 to determine whether the identification information defines a new fixed unit or the fixed unit with which the wireless terminal is presently communicating. If the answer in decision block 906 is no, then, no more processing is required, and control is transferred back to decision block 801 of FIG. 8. If the answer is yes in decision block 906, decision block 907 determines if the location has a call coverage group assigned to it. If the answer is no, control is transferred back to decision block 801 of FIG. 8. If the answer is yes in decision block 907 that there is a location call coverage group assigned to the new location, block 908 administers Table 2 to properly add the wireless terminal into that location call coverage group. In the present example, Table 2 of FIG. 14 illustrates that wireless terminal 101 was added into the tail of the call coverage group for location 213 serviced by telephone number 8213. After execution of block 908, Table 1 is updated by block 909 to reflect that the wireless terminal is now part of a new location call coverage group before control is transferred back to decision block 801 of FIG. 8.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A method for establishing call coverage groups, comprising the steps of:
   determining a physical location for one of a plurality of wireless terminals by communication between the one of the plurality of wireless terminals and an auxiliary unit; and
   inserting the one of the plurality of wireless terminals into a call coverage group based on the physical location of the one of the plurality of wireless terminals and communication between the one of the plurality of wireless terminals and the auxiliary unit.

2. The method of claim 1 wherein the step of inserting comprises the step of excluding designated ones of determined ones of the plurality of wireless terminals from the call coverage group.

3. The method of claim 2 wherein the step of excluding comprises the step of examining a table defining the wireless terminals to excluded from the call coverage group.

4. The method of claim 1 wherein the step of inserting further comprises the step of placing the one of the plurality of wireless terminals into the call coverage group in a preassigned position assigned to the auxiliary unit in response to the determination that the physical location for the one of the plurality of wireless terminals is identified with the auxiliary unit.

5. The method of claim 4 further comprises the step of removing the one of the plurality of wireless terminals from the preassigned position in the call coverage group upon communication being interrupted between the one of the plurality of wireless terminals and the auxiliary unit.

6. The method of claim 5 wherein the step of removing comprises the step of releasing the preassigned position for use by another one of the plurality of wireless terminals in the call coverage group.

7. The method of claim 6 wherein the step of determining the physical location comprises the steps of detecting physical location information by each of the plurality of wireless terminals; and transmitting the detected physical location information to a wireless switching system controlling the plurality of wireless terminals.

8. The method of claim 7 further comprises the step of transmitting the physical location information comprises the step of the auxiliary unit communicating physical location information to the one of the plurality of wireless terminals.

9. The method of claim 8 further comprises the step of transmitting the physical location information comprises the step of fixed units transmitting physical location information to other ones of the plurality of wireless terminals.

10. The method of claim 1 wherein the step of inserting further comprises the step of placing the one of the plurality of wireless terminals into the call coverage group in a position based on a predefined algorithm in response to the determination that the physical location for the one of the plurality of wireless terminals is identified with the fixed unit.

11. The method of claim 10 further comprises the step of removing the one of the plurality of wireless terminals from the position in the call coverage group upon the one of the plurality of wireless terminals no longer identifying the fixed unit.

12. The method of claim 11 wherein the step of removing comprises the step of releasing the position for use by another one of the plurality of wireless terminals in the call coverage group.

13. The method of claim 12 wherein the step of determining the physical location comprises the steps of detecting physical location information by the one of the plurality of wireless terminals from the fixed unit; and transmitting the detected physical location information to a wireless switching system controlling the plurality of wireless terminals.

* * * * *